(12) United States Patent
Quinn et al.

(10) Patent No.: US 9,085,074 B2
(45) Date of Patent: Jul. 21, 2015

(54) CHISELS

(75) Inventors: Thomas J. Quinn, Towson, MD (US); David N. Johnson, South Yorkshire (GB); Florian Probst, Freising (DE)

(73) Assignee: BLACK & DECKER INC., Newark, DE (US)

(*) Notice: Subject to any disclaimer, the term of this patent is extended or adjusted under 35 U.S.C. 154(b) by 125 days.

(21) Appl. No.: 13/425,751

(22) Filed: Mar. 21, 2012

(65) Prior Publication Data

US 2012/0301238 A1     Nov. 29, 2012

Related U.S. Application Data

(60) Provisional application No. 61/466,228, filed on Mar. 22, 2011.

(51) Int. Cl.
   *B25D 17/02*     (2006.01)
   *E21C 35/18*     (2006.01)
   (Continued)

(52) U.S. Cl.
   CPC ............... *B25D 17/02* (2013.01); *B23K 31/025* (2013.01); *B23K 37/00* (2013.01); *B28D 1/26* (2013.01); *C21D 1/613* (2013.01); *C21D 6/002* (2013.01); *C21D 6/004* (2013.01); *C21D 9/22* (2013.01);
   (Continued)

(58) Field of Classification Search
   CPC ................................ B25D 17/02; E21C 35/18
   USPC ........ 299/37.3, 37.4, 37.5, 69, 100, 101, 110, 299/111
   See application file for complete search history.

(56) References Cited

U.S. PATENT DOCUMENTS 460,639 A    10/1891   Holt
542,223 A     7/1895   Johnson
(Continued)

FOREIGN PATENT DOCUMENTS

CH    675842 A5   11/1990
DE    216607       11/1908
(Continued)

OTHER PUBLICATIONS

DeWalt High Impact Demolition Dual-Steel Chisels. A Concord Carpenter. Jul. 4, 2012 [online], [retrieved on Apr. 11, 2013]. Retrieved from the Internet <URL: http://www.aconcordcarpenter.com/2012/07/dewalt-high-impact-demolition-chisels.html>.
(Continued)

*Primary Examiner* — David Bagnell
*Assistant Examiner* — Michael Goodwin
(74) *Attorney, Agent, or Firm* — Scott B. Markow

(57) ABSTRACT

A point chisel includes a substantially cylindrical shank and a working end region that tapers to a point. The working end region has at least three converging substantially planar surfaces, each with a protruding elongate rib extending along at least part of its length. Adjacent surfaces meet along at least part of their length at substantially straight edges between adjacent ribs. A flat chisel includes a substantially cylindrical shank and a working end region with a pair of converging substantially planar surfaces that include a plurality of protruding elongate ribs extending along at least part of its length. Each rib has, along the majority of its length, a substantially constant height above the surface from which it protrudes. Each chisel is made from steel, with the shank having a bainitic microstructure and the working end region having a martensitic microstructure.

7 Claims, 7 Drawing Sheets

(51) Int. Cl.
*C21D 1/613* (2006.01)
*C21D 9/50* (2006.01)
*C22C 38/18* (2006.01)
*B23K 31/02* (2006.01)
*B23K 37/00* (2006.01)
*B28D 1/26* (2006.01)
*C21D 6/00* (2006.01)
*C21D 9/22* (2006.01)
*C22C 38/00* (2006.01)
*C22C 38/02* (2006.01)
*C22C 38/04* (2006.01)
*C22C 38/22* (2006.01)
*C22C 38/24* (2006.01)
*C22C 38/44* (2006.01)

(52) U.S. Cl.
CPC ....... *C21D 9/50* (2013.01); *C21D 9/505* (2013.01); *C22C 38/002* (2013.01); *C22C 38/02* (2013.01); *C22C 38/04* (2013.01); *C22C 38/18* (2013.01); *C22C 38/22* (2013.01); *C22C 38/24* (2013.01); *C22C 38/44* (2013.01); *E21C 35/18* (2013.01); *B25D 2222/42* (2013.01); *C21D 2211/002* (2013.01); *C21D 2211/008* (2013.01); *Y10T 408/89* (2015.01)

(56) References Cited

U.S. PATENT DOCUMENTS

| | | | |
|---|---|---|---|
| 1,350,241 | A | 8/1920 | Routh |
| 1,398,156 | A | 11/1921 | Schroeder |
| 1,499,584 | A | 7/1924 | Litchfield |
| 1,570,650 | A | 1/1926 | Thomson |
| 1,887,372 | A | 11/1931 | Emmons |
| RE19,182 | E | 5/1934 | Emmons |
| D92,385 | S | 6/1934 | Bardwell |
| 1,984,839 | A | 12/1934 | Murray |
| 2,101,347 | A | 12/1937 | Robinette |
| 2,193,196 | A | 3/1940 | Bannister |
| 2,302,069 | A * | 11/1942 | Stephens ............... 299/100 |
| 2,332,295 | A | 10/1943 | Bouchal |
| D137,744 | S | 4/1944 | Gunderson |
| 2,652,083 | A | 9/1953 | Emmons |
| 2,708,853 | A | 5/1955 | MacLean |
| 2,740,974 | A | 4/1956 | Lewis |
| 2,769,355 | A | 11/1956 | Crisp |
| 2,936,658 | A | 5/1960 | Riley |
| 3,027,953 | A | 4/1962 | Coski |
| 3,085,453 | A | 4/1963 | Mossberg |
| 3,387,511 | A | 6/1968 | Ackart, Sr. et al. |
| 3,476,438 | A * | 11/1969 | Bower, Jr. ............... 299/110 |
| 3,559,513 | A | 2/1971 | Hougen |
| 3,592,555 | A | 7/1971 | Mackey, Sr. |
| 3,609,056 | A | 9/1971 | Hougen |
| 3,648,508 | A | 3/1972 | Hougen |
| 3,655,244 | A | 4/1972 | Swisher |
| 3,746,396 | A * | 7/1973 | Radd .................. 299/10 |
| 3,779,664 | A | 12/1973 | Caley et al. |
| 3,825,362 | A | 7/1974 | Hougen |
| 4,144,868 | A | 3/1979 | Heitbrink |
| 4,210,215 | A | 7/1980 | Peetz et al. |
| D257,511 | S | 11/1980 | Zahn |
| 4,265,574 | A | 5/1981 | Eckle |
| 4,340,327 | A | 7/1982 | Martins |
| 4,383,784 | A | 5/1983 | Gulbrandsen |
| D269,495 | S | 6/1983 | Finn |
| 4,529,341 | A | 7/1985 | Greene |
| 4,556,347 | A | 12/1985 | Barish |
| 4,605,347 | A | 8/1986 | Jodock et al. |
| 4,711,609 | A | 12/1987 | Seefluth |
| 4,756,650 | A | 7/1988 | Wakihira et al. |
| 4,762,445 | A | 8/1988 | Bunting et al. |
| 4,787,788 | A | 11/1988 | Versteeg |
| 4,826,368 | A | 5/1989 | Tikai et al. |
| 4,880,707 | A | 11/1989 | Kohno et al. |
| 4,898,503 | A | 2/1990 | Barish |
| 4,926,558 | A | 5/1990 | Brace |
| 4,967,855 | A | 11/1990 | Moser |
| 4,968,193 | A | 11/1990 | Chaconas et al. |
| 4,983,079 | A | 1/1991 | Imanaga et al. |
| 5,011,342 | A | 4/1991 | Hsu |
| 5,056,967 | A | 10/1991 | Hageman |
| 5,088,863 | A | 2/1992 | Imanaga et al. |
| 5,152,642 | A | 10/1992 | Pitts et al. |
| 5,230,593 | A | 7/1993 | Imanaga et al. |
| 5,288,183 | A | 2/1994 | Chaconas et al. |
| D346,103 | S | 4/1994 | Warner |
| 5,350,261 | A | 9/1994 | Takaya et al. |
| 5,442,979 | A | 8/1995 | Hsu |
| 5,580,196 | A | 12/1996 | Thompson et al. |
| 5,934,845 | A | 8/1999 | Frey |
| 5,947,660 | A | 9/1999 | Karlsson et al. |
| 6,007,279 | A | 12/1999 | Malone, Jr. |
| D419,575 | S | 1/2000 | Kouvells |
| 6,045,302 | A | 4/2000 | Orr |
| 6,050,754 | A | 4/2000 | Thomas |
| 6,089,337 | A | 7/2000 | Kleine et al. |
| 6,102,634 | A | 8/2000 | Turner et al. |
| 6,113,321 | A | 9/2000 | Mulroy et al. |
| 6,190,097 | B1 | 2/2001 | Thomas |
| 6,227,774 | B1 | 5/2001 | Haughton et al. |
| 6,309,149 | B1 | 10/2001 | Borschert et al. |
| 6,312,432 | B1 | 11/2001 | Leppelmeier |
| 6,443,674 | B1 | 9/2002 | Jaconi |
| 6,511,268 | B1 | 1/2003 | Vasudeva et al. |
| 6,637,987 | B2 | 10/2003 | Lui et al. |
| D482,252 | S | 11/2003 | Hyde |
| 6,652,203 | B1 | 11/2003 | Risen, Jr. |
| 6,705,807 | B1 | 3/2004 | Rudolph et al. |
| 6,739,872 | B1 | 5/2004 | Turri |
| 6,851,898 | B2 | 2/2005 | Ege et al. |
| 6,857,832 | B2 | 2/2005 | Nygard |
| 6,981,496 | B2 | 1/2006 | Szendrovari et al. |
| D525,840 | S | 8/2006 | Bruce |
| 7,178,878 | B2 | 2/2007 | Rompel |
| 7,241,085 | B2 | 7/2007 | Frisendahl |
| 7,258,513 | B2 | 8/2007 | Gertner |
| 7,267,514 | B2 | 9/2007 | Wetzl et al. |
| 7,363,922 | B2 | 4/2008 | Lang et al. |
| 7,398,840 | B2 | 7/2008 | Ladi et al. |
| 7,520,703 | B2 | 4/2009 | Rompel |
| D594,306 | S | 6/2009 | Decker |
| 7,578,726 | B2 | 8/2009 | Gasser |
| 7,784,381 | B2 | 8/2010 | Ladi et al. |
| 7,784,567 | B2 | 8/2010 | Choe et al. |
| 7,802,495 | B2 | 9/2010 | Oxford et al. |
| 7,851,067 | B2 | 12/2010 | Caliskanoglu et al. |
| 7,900,719 | B2 * | 3/2011 | Yao ................. 175/320 |
| 7,913,779 | B2 | 3/2011 | Choe et al. |
| D637,629 | S | 5/2011 | Clark |
| D648,356 | S | 11/2011 | Clark |
| 8,168,009 | B2 | 5/2012 | Mesquita et al. |
| 8,201,648 | B2 | 6/2012 | Choe et al. |
| D664,167 | S | 7/2012 | Lampe |
| 8,230,762 | B2 | 7/2012 | Choe et al. |
| 8,449,041 | B2 * | 5/2013 | Monyak et al. ............ 299/106 |
| D687,871 | S | 8/2013 | Liao et al. |
| 8,740,515 | B2 | 6/2014 | Thomas et al. |
| 2002/0046885 | A1 | 4/2002 | Eichhorn |
| 2002/0160235 | A1 | 10/2002 | Caminiti |
| 2003/0017015 | A1 | 1/2003 | Strubler |
| 2003/0202853 | A1 | 10/2003 | Ko et al. |
| 2003/0215297 | A1 | 11/2003 | Frisendahl |
| 2004/0052595 | A1 | 3/2004 | Dembicks et al. |
| 2004/0191015 | A1 | 9/2004 | Kozak |
| 2004/0253379 | A1 | 12/2004 | Sugita et al. |
| 2005/0053438 | A1 | 3/2005 | Wetzl et al. |
| 2005/0098358 | A1 | 5/2005 | Nadler |
| 2005/0126829 | A1 | 6/2005 | Meierhofer et al. |
| 2006/0056930 | A1 | 3/2006 | Rompel |
| 2007/0062046 | A1 | 3/2007 | Hsu |
| 2008/0056835 | A1 | 3/2008 | Astrand et al. |
| 2008/0166194 | A1 | 7/2008 | Durfee |

(56) References Cited

U.S. PATENT DOCUMENTS

| | | | |
|---|---|---|---|
| 2008/0189957 A1 | 8/2008 | Kasper | |
| 2009/0133785 A1 | 5/2009 | Ayada | |
| 2009/0283334 A1 | 11/2009 | Durairajan et al. | |
| 2009/0320299 A1* | 12/2009 | Kuhn et al. | 30/169 |
| 2010/0003094 A1 | 1/2010 | Durfee | |
| 2010/0054881 A1 | 3/2010 | Thomas et al. | |
| 2010/0135741 A1 | 6/2010 | Probst et al. | |
| 2010/0183391 A1 | 7/2010 | Kersten | |
| 2010/0192475 A1 | 8/2010 | Stevens et al. | |
| 2010/0193255 A1 | 8/2010 | Stevens et al. | |
| 2010/0232898 A1 | 9/2010 | Friedrichs | |
| 2010/0276205 A1 | 11/2010 | Oxford et al. | |
| 2011/0142707 A1 | 6/2011 | Choe et al. | |
| 2011/0168453 A1 | 7/2011 | Kersten et al. | |
| 2011/0186261 A1 | 8/2011 | Choe et al. | |
| 2012/0003057 A1 | 1/2012 | Leyba | |
| 2012/0301238 A1 | 11/2012 | Quinn et al. | |
| 2013/0209183 A1 | 8/2013 | Chuo et al. | |
| 2014/0126972 A1 | 5/2014 | Santamarina et al. | |
| 2014/0219737 A1 | 8/2014 | Takai et al. | |

FOREIGN PATENT DOCUMENTS

| | | |
|---|---|---|
| DE | 463571 A | 8/1928 |
| DE | 808001 C | 7/1951 |
| DE | 812373 C | 8/1951 |
| DE | 828385 A | 1/1952 |
| DE | 764144 | 7/1952 |
| DE | 860784 | 12/1952 |
| DE | 1468790 | 2/1969 |
| DE | 7335696 | 10/1973 |
| DE | 2345965 | 3/1974 |
| DE | 2358048 | 5/1975 |
| DE | 7342602 | 4/1976 |
| DE | 2629130 | 1/1978 |
| DE | 2730596 A1 | 1/1978 |
| DE | 2946103 | 5/1981 |
| DE | 3127740 A1 | 2/1982 |
| DE | 8321414 U1 | 10/1983 |
| DE | 8320045 U1 | 11/1983 |
| DE | 3342135 | 5/1985 |
| DE | 3342137 | 5/1985 |
| DE | 3344720 | 6/1985 |
| DE | 8536123 | 4/1987 |
| DE | 3841128 | 6/1990 |
| DE | 3927615 | 2/1991 |
| DE | 4117486 | 12/1992 |
| DE | 29516413 | 4/1996 |
| DE | 19807609 | 6/1999 |
| DE | 19914522 C2 | 5/2000 |
| DE | 20006156 U1 | 6/2000 |
| DE | 20005730 | 10/2000 |
| DE | 10057124 A1 | 5/2001 |
| DE | 20203232 | 5/2002 |
| DE | 10130681 | 1/2003 |
| DE | 20209767 | 11/2003 |
| DE | 20211589 | 1/2004 |
| DE | 202004012846 U1 | 10/2004 |
| DE | 102006049096 | 4/2008 |
| DE | 102007006943 | 8/2008 |
| DE | 102007046759 A1 | 4/2009 |
| DE | 102010031313 A1 | 5/2009 |
| EP | 0156789 | 2/1985 |
| EP | 0156789 A1 | 2/1985 |
| EP | 0249104 | 12/1987 |
| EP | 0455420 | 11/1991 |
| EP | 0586337 | 12/1992 |
| EP | 0586337 A2 | 12/1992 |
| EP | 0522202 | 3/1995 |
| EP | 0743136 | 11/1996 |
| EP | 0743136 A1 | 11/1996 |
| EP | 0855950 | 8/1998 |
| EP | 0925881 | 6/1999 |
| EP | 0925881 A1 | 6/1999 |
| EP | 1238732 | 9/2002 |
| EP | 1260296 | 11/2002 |
| EP | 1413403 A1 | 4/2004 |
| EP | 1016480 | 9/2004 |
| EP | 2058073 | 5/2009 |
| FR | 2486853 A1 | 1/1982 |
| FR | 2829715 | 3/2003 |
| GB | 169885 A | 10/1921 |
| GB | 699716 | 11/1953 |
| GB | 705784 | 3/1954 |
| GB | 1360221 | 7/1974 |
| GB | 2193913 | 2/1988 |
| JP | 61226209 | 1/1986 |
| JP | 62188614 | 8/1987 |
| JP | 1140908 | 6/1989 |
| JP | 4244311 | 9/1992 |
| JP | 05-2881 | 1/1993 |
| JP | 9225720 | 9/1997 |
| JP | 2001105216 | 4/2001 |
| JP | 2003225819 | 8/2003 |
| JP | 2004175091 | 6/2004 |
| JP | 4318231 | 8/2009 |
| JP | 3184707 | 7/2013 |
| SU | 0844160 | 7/1981 |
| SU | 1238905 | 6/1986 |
| WO | 9740965 A1 | 11/1997 |
| WO | WO9740965 | 11/1997 |
| WO | WO0136163 | 5/2001 |
| WO | WO2004037472 | 5/2004 |
| WO | WO2004011179 | 2/2005 |

OTHER PUBLICATIONS

DeWalt XLR Concrete Drilling and Chiselling, p. 9. Oct. 22, 2012 [online], [retrieved from the Internet <URL: http:www.dewalt.co.uk/DWBrochureStorage/Downloads/XLRConcrete//1/ebrochure.pdf>.

Search Report—European Patent Office for related application 12159910.4, Aug. 6, 2012.

Search Report—European Patent Office for related application12159909.6, Aug. 6, 2012.

Search Report—European Patent Office for related application12159908.8, Aug. 6, 2012.

Rilliard, Arnaud—European Search Report re: corresponding European Patent Application No. 14160023.9—Dec. 18, 2014—9 pages—The Hague.

Twist Drills Standard (ASME B94: 11-M-1993)—The American Society of Mechanical Engineers—pp. 1-3, 7-33, 48-49, 56-59—Mar. 1, 1994.

National Aerospace Standard (NAS-907)—Aerospace Industries Assoc. of America, Inc.—pp. 1-25—1986.

Black & Decker Inc.—1983-1984 Consumer Trade Catalog—p. 28—1983.

Popov, Egor P.—"Design of Nonprismatic Beams"—Introduction to Mechanics of Solids—pp. 360-362.

Rilliard, Arnaud—European Search Report re: EP14182342—Jan. 28, 2015—10 pages—The Hague.

\* cited by examiner

CHISELS

RELATED APPLICATIONS

The present application claims priority under 35 U.S.C. §119(e) to U.S. Provisional Patent Application No. 61/466,228, filed Mar. 22, 2011, titled "Chisels," which is incorporated by reference.

TECHNICAL FIELD

The present application relates to chisels, especially to chisel bits for attachment to powered hammer drills or powered rotary hammers.

SUMMARY

The present application seeks to provide improved chisel shapes and materials, and also to provide an improved process of producing chisels.

According to a first aspect, a point chisel includes a substantially circular cross-section shank having a longitudinal axis and including a tapered working end region in which the shank tapers to a working point, the tapered working end region comprising at least three converging substantially planar ribbed surfaces, each of which includes an elongate rib protruding therefrom and extending along at least part of the length thereof, wherein adjacent ribbed surfaces meet each other along at least part of their length at a substantially straight edge region situated between adjacent elongate ribs.

Embodiments of this aspect may include one or more of the following features. Each substantially straight edge region may project radially outwardly with respect to the longitudinal axis. Each substantially straight edge region may be rounded in cross-section along at least part of its length. The tapered working end region may include a working point region situated between the ribbed surfaces and the working point, the working point region comprising at least three converging substantially planar non-ribbed surfaces which meet at the working point. Each non-ribbed surface may extend from a respective ribbed surface but is not coplanar therewith. The non-ribbed surfaces may converge at a greater angle than do the ribbed surfaces. Each rib may include a front end surface substantially coplanar with, and extending into, a respective non-ribbed surface of the working point region.

Each rib may have longitudinally extending substantially parallel and substantially planar side walls. Each rib may have a substantially constant width along its length. Each rib may vary in height along its length, above its respective ribbed surface. For example, each rib may include an apex situated part way along its length. The point chisel may include at least four, e.g., exactly four, converging substantially planar ribbed surfaces. There may be the same number of non-ribbed surfaces as ribbed surfaces.

According to a second aspect, a flat chisel has a working edge, the chisel comprising a substantially cylindrical shank having a longitudinal axis and including a working end region comprising a pair of converging substantially planar ribbed surfaces on opposite sides of the longitudinal axis, each of which extends directly from a cylindrical surface of the shank and includes a plurality of elongate ribs protruding therefrom and extending along at least part of the length thereof, each rib having, along the majority of its length, a substantially constant height above the surface from which it protrudes.

Embodiments of this aspect may include one or more of the following features. The ribs of each ribbed surface of the flat chisel may be substantially parallel to each other, and may be substantially parallel to a plane that extends through the longitudinal axis and perpendicular to the ribbed surfaces. Each ribbed surface of the flat chisel may have at least three, e.g., exactly three, ribs. At least one of the ribs of each ribbed surface may be longer than the other rib or ribs. For example, a middle rib may be longer than the ribs situated on each side of it. Each rib of the flat chisel may have a substantially constant width along its length. Each rib of the flat chisel may have generally flat side walls and/or a substantially flat upper surface. The substantially flat upper surface may be substantially parallel to the surface from which the rib protrudes.

The working end region of the flat chisel may include a widened portion which is wider than the cylindrical shank, and which extends to the working edge. Two of the ribs of each ribbed surface may extend along, or adjacent to, opposite lateral edges of the widened portion. Respective side walls of two of the ribs of each ribbed surface may form part of opposite lateral surfaces defining the opposite lateral edges of the widened portion.

The working end region of the flat chisel may include a working edge region situated between the ribbed surfaces and the working edge, the working edge region comprising a pair of converging substantially planar non-ribbed surfaces, each of which extends from a respective ribbed surface, which non-ribbed surfaces meet at the working edge. Each non-ribbed surface may be non-coplanar with the ribbed surface from which it extends. The non-ribbed surfaces may converge at a greater angle than do the ribbed surfaces. Each rib may include a front end surface substantially coplanar with, and extending into, a respective non-ribbed surface of the working edge region.

According to a third aspect, a steel chisel comprises an elongate shank having a longitudinal axis, and a working end region, wherein the steel of the shank has a microstructure comprising bainite, and the steel of the working end region has a microstructure comprising martensite.

Embodiments of this aspect may include one or more of the following features. The shank and the working end region may be welded together, e.g., friction welded together. The steel of the working end region may be selected from the group consisting of: S7; 1.2357 50CrMoV 13-14; 1.2542 45WCrV7; and 1.2362 X63CrMoV 5-1. The steel of the shank may be selected from the group consisting of: 1.6582 34CrNiMo6; and 1.2249 45SiCrV6. The chisel may comprise a point chisel wherein the working end region includes a working point. For example, the chisel may comprise a point chisel according to the first aspect of the invention. Alternatively, the chisel may comprise a flat chisel wherein the working end region includes a working edge. For example, the chisel may comprise a flat chisel according to the second aspect of the invention.

According to a fourth aspect, a process of producing a steel chisel, comprises:
(a) providing a shank portion of the chisel formed from a first steel composition;
(b) providing a working end portion of the chisel formed from a second steel composition, the second steel composition being different to the first steel composition;
(c) joining together the shank portion and the working end portion;
(d) heating the joined shank and working end portions such that they both have a microstructure comprising austenite; and
(e) cooling the heated joined shank and working end portions such that the first steel composition of the shank portion adopts a microstructure comprising bainite and such that the second steel composition of the working end portion adopts a microstructure comprising martensite.

Embodiments of this aspect may include one or more of the following features. Step (c) of the process according to the fourth aspect of the invention may include welding together the shank portion and the working end portion, e.g., by friction welding together the shank portion and the working end portion. Step (d) of the process may include heating the joined shank and working end portions to a temperature of at least 730 degrees Celsius, e.g., at least 750 degrees Celsius, at least 850 degrees Celsius, at least 950 degrees Celsius, or at least 1050 degrees Celsius. The joined shank and working end portions may be heated to a temperature no greater than 1200 degrees Celsius, e.g., no greater than 1100 degrees Celsius. The heating of step (d) may be carried out for at least 8 minutes, e.g., for at least 12 minutes, or for approximately 17.5 minutes.

Step (e) of the process may include quenching (quench cooling), e.g., gas quenching, the joined shank and working end portions. The quench gas may comprise a mixture of hydrogen and nitrogen gases. For example, the cooling of step (e) may be carried out for at least 5 minutes, e.g., for at least 6 minutes, for approximately 7.25 minutes, for no more than 10 minutes, and/or for no more than 8 minutes.

The bainitic microstructure of the shank portion provides toughness and durability, without brittleness. The martensitic microstructure of the working end portion provides hardness. The second steel composition of the working end portion, having a microstructure comprising martensite, may be tempered as required, to achieve the required hardness and durability (i.e. the required balance between hardness and brittleness).

According to a fifth aspect, a process of producing a steel chisel, comprises:
(a) providing a shank portion of the chisel formed from a first steel composition selected from the group consisting of: 1.6582 34CrNiMo6; and 1.2249 45SiCrV6;
(b) providing a working end portion of the chisel formed from a second steel composition selected from the group consisting of: S7; 1.2357 50CrMoV 13-14; 1.2542 45WCrV7; and 1.2362 X63CrMoV 5-1;
(c) joining together the shank portion and the working end portion;
(d) heating the joined shank and working end portions to a temperature of at least 730 degrees Celsius such that they both have a microstructure comprising austenite; and
(e) cooling the heated joined shank and working end portions such that the first steel composition of the shank portion adopts a microstructure comprising bainite and such that the second steel composition of the working end portion adopts a microstructure comprising martensite.

Embodiments of this aspect may include one or more of the following features. Step (c) of the process according to the fifth aspect of the invention may comprise welding together the shank portion and the working end portion, e.g., friction welding together the shank portion and the working end portion. Step (d) of the process according to the fifth aspect of the invention may include heating the joined shank and working end portions to a temperature of, e.g., at least 750 degrees Celsius, at least 850 degrees Celsius, at least 950 degrees Celsius, or approximately 1050 degrees Celsius. The joined shank and working end portions may be heated to a temperature of no greater than 1200 degrees Celsius, e.g., greater than 1100 degrees Celsius. The heating of step (d) may be carried out for, e.g., at least 8 minutes, at least 12 minutes, or approximately 17 minutes.

Step (e) of the process according to the fifth aspect of the invention may comprise quenching (quench cooling), especially gas quenching, the joined shank and working end portions. The quench gas may comprise a mixture of hydrogen and nitrogen gases. The cooling of step (e) is carried out for at least 5 minutes, e.g., for at least 6 minutes, for example for approximately 7.25 minutes. The cooling of step (e) may be carried out for no more than 10 minutes, e.g., for no more than 8 minutes.

The bainitic microstructure of the shank portion provides toughness and durability, without brittleness. The martensitic microstructure of the working end portion provides hardness. The second steel composition of the working end portion, having a microstructure comprising martensite, may be tempered as required, to achieve the required hardness and durability (i.e. the required balance between hardness and brittleness).

The chisels of each of the first, second and third aspects of the invention may be produced by the process according to the fourth aspect of the invention or by the process according to the fifth aspect of the invention. The shank portion of the process provides the shank region of the chisel, and the working end portion of the process provides the working end region of the chisel.

The chisels according to this application may be chisel bits for use with power tools such as hammer drills or rotary hammers. The shank of the chisel at an opposite end region to the working end region may have a power tool attachment configuration, for example an "SDS" type of attachment configuration, for example, an SDS-PLUS or SDS-MAX attachment configuration.

DETAILED DESCRIPTION OF THE DRAWINGS

Figure 1:
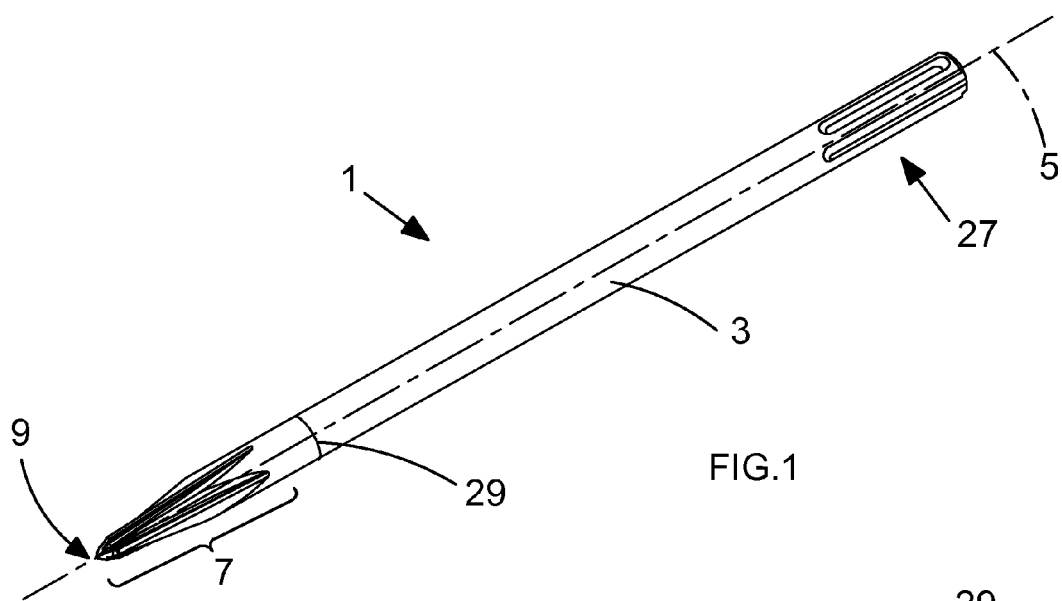
FIG. 1 shows an embodiment of a point chisel.
Figure 2:
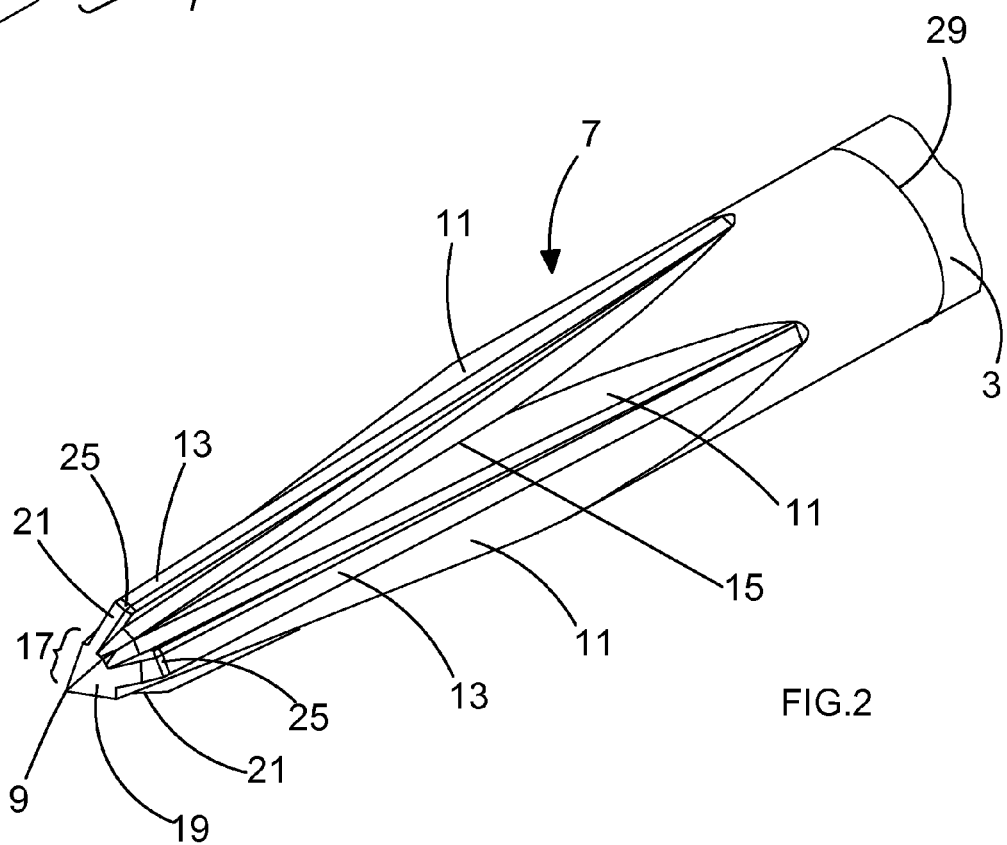
FIG. 2 shows a detail of the point chisel of FIG. 1.
Figure 3A:
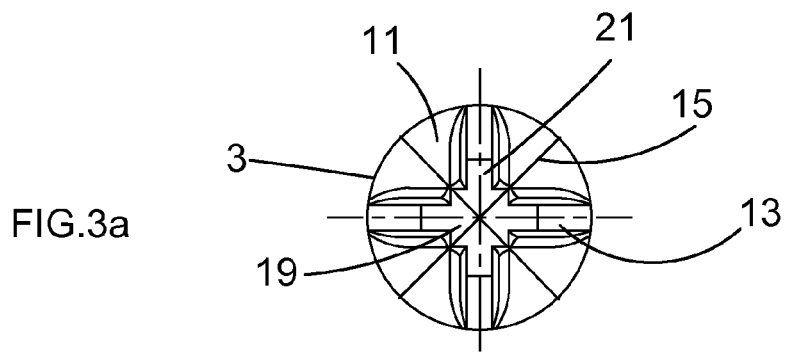
FIGS. 3(a) and 3(b) show further views of the point chisel of FIGS. 1 and 2.
Figure 3B:
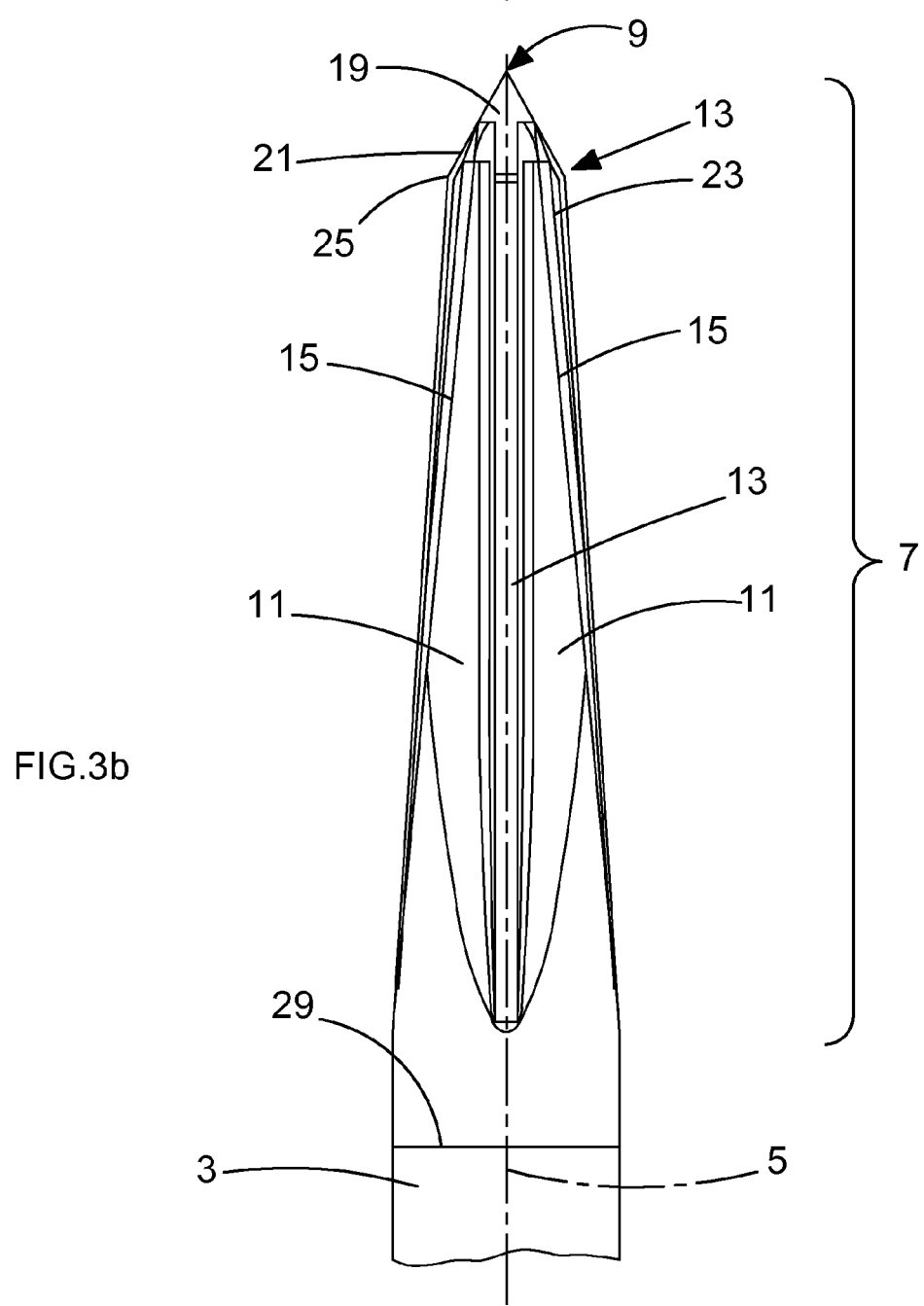

FIGS. 1, 2 and 3 show an embodiment of a point chisel 1. FIG. 1 shows the entire chisel 1, FIG. 2 shows a detail of FIG. 1, FIG. 3(a) shows a front end view of the chisel 1, and FIG. 3(b) shows a side view of the detail of FIG. 2. The point chisel 1 includes a substantially circular cross-section shank 3 having a longitudinal axis 5. At one end of the shank 3 there is provided a known type of attachment configuration 27 for attaching the chisel to a hammer drill or rotary hammer. At the opposite end of the shank 3 a tapered working end region 7 is provided, in which the shank 3 tapers to a working point 9. The tapered working end region 7 comprises four converging substantially planar ribbed surfaces 11, each of which includes an elongate rib 13 protruding from the surface 11 and extending along the length of the surface. Adjacent ribbed surfaces 11 meet each other along part of their length at a substantially straight edge region 15 situated between adjacent elongate ribs 13. Each substantially straight edge region 15 projects radially outwardly with respect to the longitudinal axis 5.

The tapered working end region 7 includes a working point region 17 situated between the ribbed surfaces 11 and the working point 9. The working point region 17 comprises four converging substantially planar non-ribbed surfaces 19 which meet at the working point 9. Each non-ribbed surface 19 extends from a respective ribbed surface 11 but is not coplanar with it. The non-ribbed surfaces 19 converge at a greater angle than do the ribbed surfaces 11. Each rib 13 includes a front end surface 21 substantially coplanar with, and extending into, a respective non-ribbed surface 19 of the working point region 17. Each rib 13 has longitudinally extending substantially parallel and substantially planar side walls 23, and has a substantially constant width along its length. Additionally, each rib 13 varies in height along its length, above its respective ribbed surface, such that it includes an apex 25 situated part way along its length.

The shank 3 of the point chisel 1 is formed from steel having a microstructure comprising bainite, and the working end region 7 of the chisel 1 is formed from steel having a microstructure comprising martensite. The shank 3 and the working end region 7 have been welded together, by friction welding, and the weld joint is indicated at 29.

Figure 4:
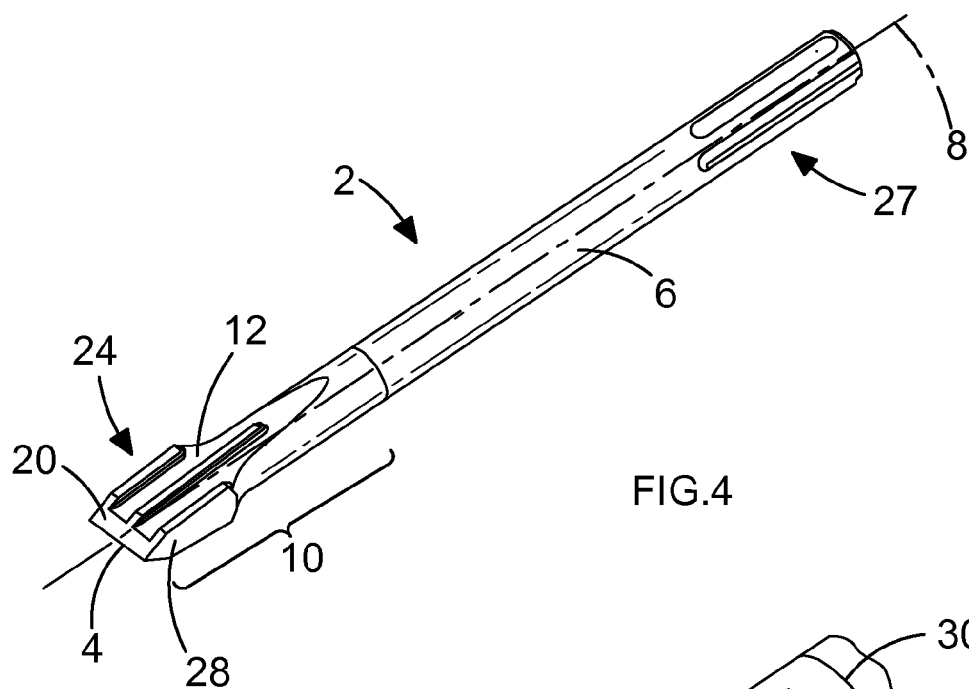
FIG. 4 shows an embodiment of a flat chisel.
Figure 5:
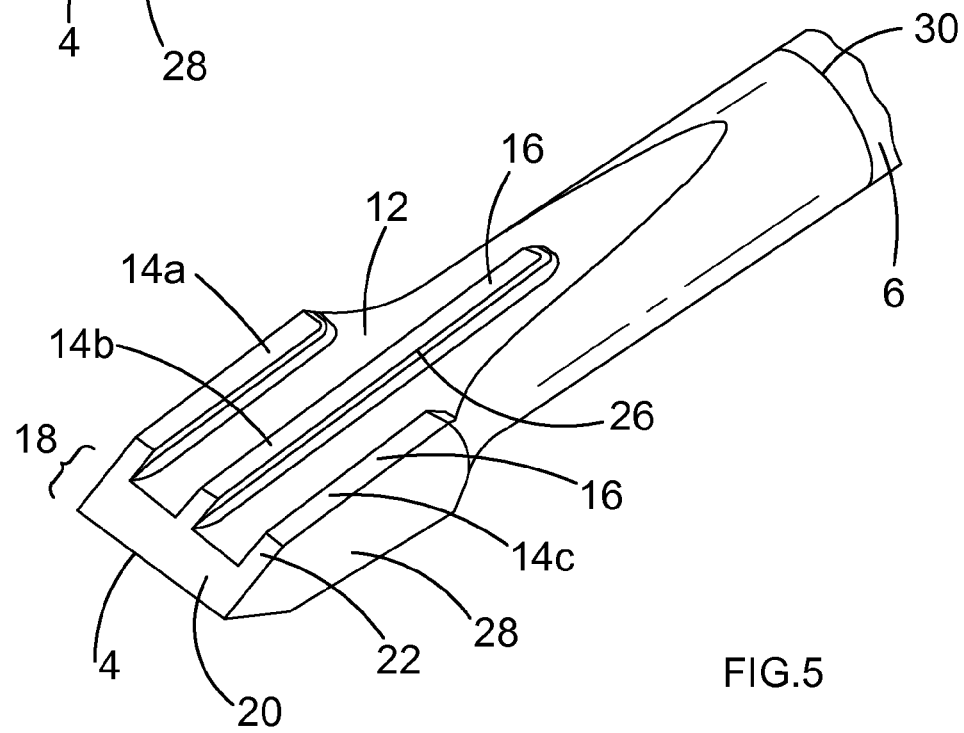
FIG. 5 shows a detail of the flat chisel of FIG. 4.
Figure 6A:
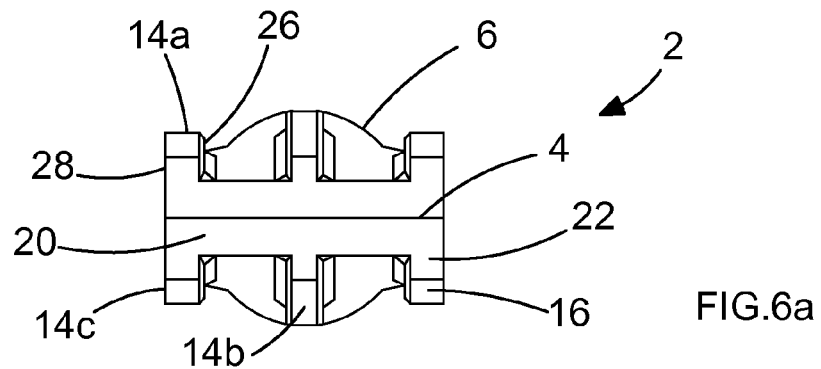
FIGS. 6(a) and 6(b) show further views of the flat chisel of FIGS. 4 and 5.
Figure 6B:
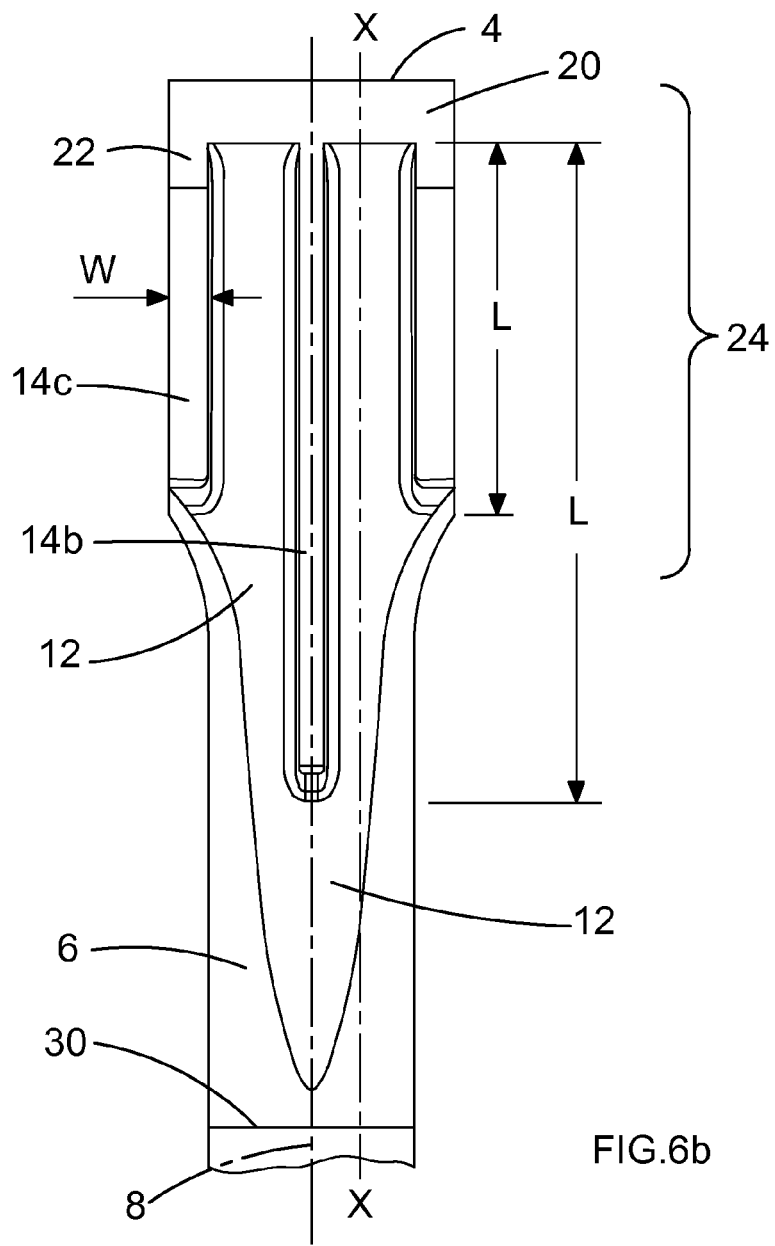
Figure 7:
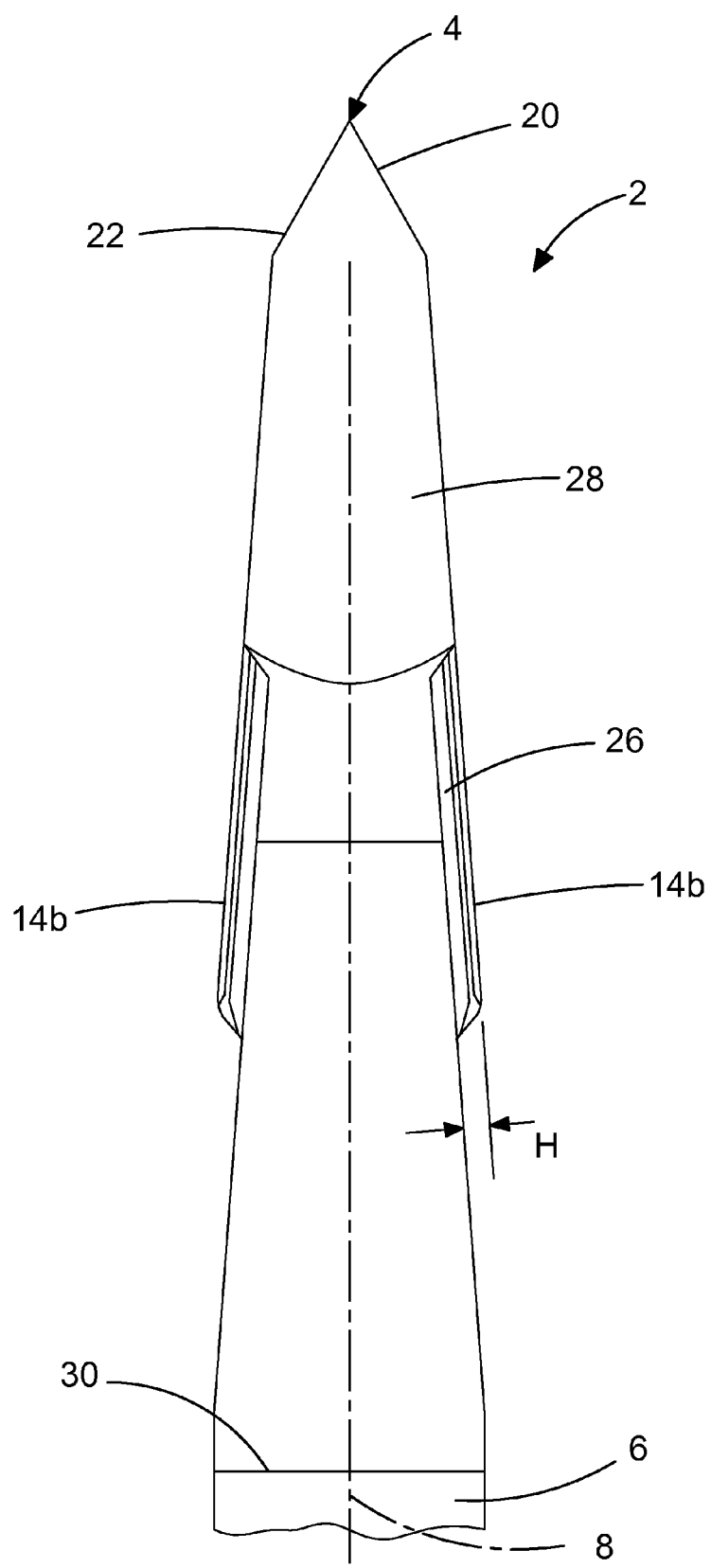
FIG. 7 shows a further detail of the flat chisel of FIGS. 4 to 6.
Figure 8:
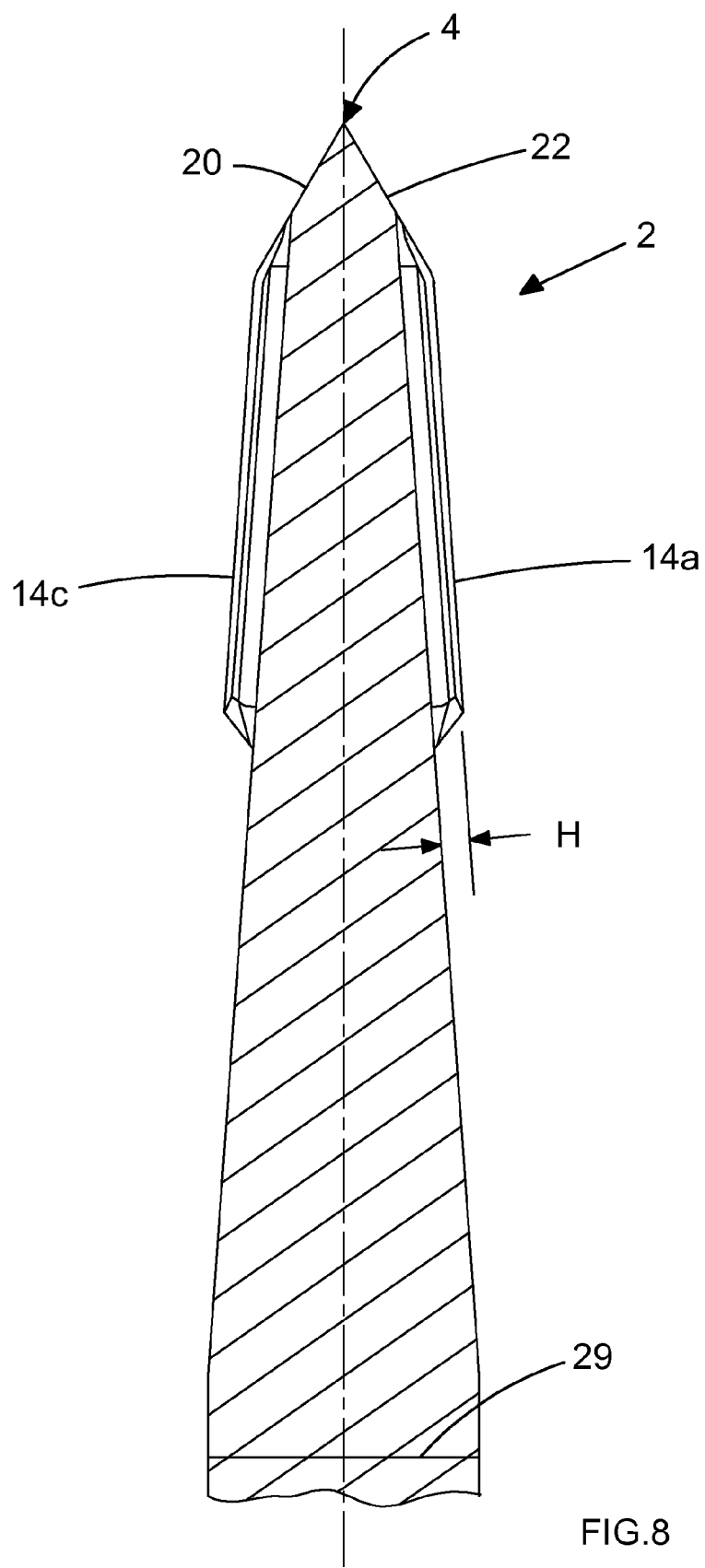
FIG. 8 shows a cross-sectional view of the detail of FIG. 7.

FIGS. 4 to 8 show an embodiment of a flat chisel 2 according to the invention. FIG. 4 shows the entire chisel 2, FIG. 5 shows a detail of FIG. 4, FIG. 6(a) shows a front end view of the chisel 2, FIG. 6(b) shows a side view of the detail of FIG. 5, FIG. 7 shows a perpendicular side view of the detail of FIG. 5, and FIG. 8 shows a cross-section X-X through the side view of FIG. 6. The flat chisel 2, which has a working edge 4, comprises a substantially cylindrical shank 6 having a longitudinal axis 8. At one end of the shank 6 there is provided a known type of attachment configuration 27 for attaching the chisel to a hammer drill or rotary hammer. At the opposite end of the shank 6 a working end region 10 is provided, comprising a pair of converging substantially planar ribbed surfaces 12 on opposite sides of the longitudinal axis 8. Each ribbed surface 12 extends directly from a cylindrical surface of the shank 6 and includes three elongate ribs 14a, 14b and 14c protruding from the surface and extending along part of the length of the surface. Each rib 14 has, along the majority of its length L, a substantially constant height H above the surface 12 from which it protrudes.

The ribs 14 of each ribbed surface 12 of the flat chisel 2 are substantially parallel to each other, and are parallel to a plane that extends through the longitudinal axis 8 and perpendicular to the ribbed surfaces 12. The central rib 14b of each ribbed surface 12 is longer than the ribs 14a and 14c situated on each side of it. Each rib 14 has a substantially constant width W along its length L, and has a substantially flat upper surface 16, which is substantially parallel to the surface 12 from which the rib protrudes.

The working end region 10 of the flat chisel 2 includes a working edge region 18 situated between the ribbed surfaces 12 and the working edge 4. The working edge region 10 comprises a pair of converging substantially planar non-ribbed surfaces 20, each of which extends from a respective ribbed surface 12, which non-ribbed surfaces meet at the working edge 4. Each non-ribbed surface 20 is not coplanar with the ribbed surface 12 from which it extends, and the non-ribbed surfaces 20 converge at a greater angle than do the ribbed surfaces 12. Each rib 14 includes a front end surface 22 substantially coplanar with, and extending into, a respective non-ribbed surface 20 of the working edge region 18.

The working end region 10 of the flat chisel includes a widened portion 24 which is wider than the cylindrical shank 6, and which extends to the working edge 4. Two of the ribs 14a, 14c of each ribbed surface 12 extend along opposite lateral edges of the widened portion 24, such that respective side walls 26 of the two ribs form part of opposite lateral surfaces 28 defining the opposite lateral edges of the widened portion 24.

The shank 6 of the flat chisel 2 is formed from steel having a microstructure comprising bainite, and the working end region 10 of the chisel 2 is formed from steel having a microstructure comprising martensite. The shank 6 and the working end region 10 have been welded together, by friction welding, and the weld joint is indicated at 30.

Each of the chisel 1 and the chisel 2 may be formed using the following process steps:

(a) providing a shank portion of the chisel formed from a first steel composition;

(b) providing a working end portion of the chisel formed from a second steel composition, the second steel composition being different to the first steel composition;

(c) joining together the shank portion and the working end portion, for example by a welding operation, such as friction welding;

(d) heating the joined shank and working end portions such that they both have a microstructure comprising austenite; and (e) cooling the heated joined shank and working end portions such that the first steel composition of the shank portion adopts a microstructure comprising bainite and such that the second steel composition of the working end portion adopts a microstructure comprising martensite.

Step (d) of the process may include heating the joined shank and working end portions to a temperature of at least 730 degrees Celsius, e.g., at least 750 degrees Celsius, at least 850 degrees Celsius, at least 950 degrees Celsius, or at least 1050 degrees Celsius. The joined shank and working end portions may be heated to a temperature no greater than 1200 degrees Celsius, e.g., no greater than 1100 degrees Celsius. The heating of step (d) may be carried out for at least 8 minutes, e.g., for at least 12 minutes, or for approximately 17.5 minutes.

Step (e) of the process may include quenching (quench cooling), e.g., gas quenching, the joined shank and working end portions. The quench gas may comprise a mixture of hydrogen and nitrogen gases. For example, the cooling of step (e) may be carried out for at least 5 minutes, e.g., for at least 6 minutes, for approximately 7.25 minutes, for no more than 10 minutes, and/or for no more than 8 minutes.

The steel of the working end region may be selected from the group consisting of: S7; 1.2357 50CrMoV 13-14; 1.2542 45WCrV7; and 1.2362 X63CrMoV 5-1. The steel of the shank may be selected from the group consisting of: 1.6582 34CrNiMo6; and 1.2249 45SiCrV6. The bainitic microstructure of the shank portion provides toughness and durability, without brittleness. The martensitic microstructure of the working end portion provides hardness. The second steel composition of the working end portion, having a microstructure comprising martensite, may be tempered as required, to achieve the required hardness and durability (i.e. the required balance between hardness and brittleness).

Figure 9:
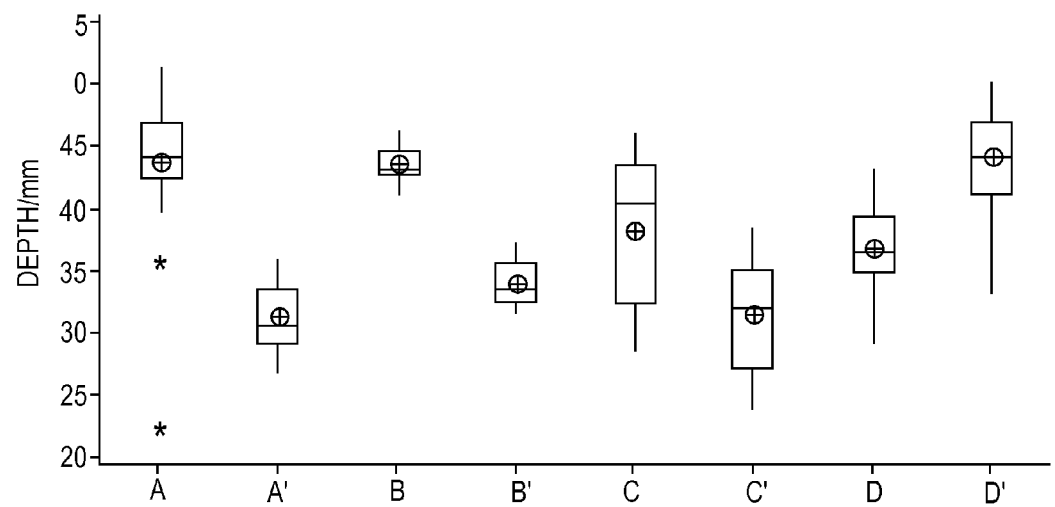
FIG. 9 is a box plot showing data from comparative tests of depth of hole drilled.

FIG. 9 is a box plot of the hole depth drilled during 15 seconds of operation, in B40 grade concrete using four different chisel samples. Data was collected from a range of chisels, in four sample sets, A, B, C and D. Sample sets A, B and C contained currently available point chisels from three different sources, not according to the invention. Sample set D contained point chisels of a shape and material according to relevant aspects of the invention. For each sample set, the depth of hole which could be drilled during 15 seconds of operation was measured for new chisels (A, B, C, D), and for chisels which had already been used for 240 minutes (A', B', C', D').

FIG. 9 shows that the speed of the chisels according to the invention is slightly lower than the speed of chisels in the comparative samples, when the chisels are new. However, the speed of chisels according to the invention which had already been used for 240 minutes was very good, especially in comparison to the chisels from sample sets A, B and C which had already been used for 240 minutes. Furthermore, the speed of the chisels according to the invention increased after the chisels had been used for 240 minutes, rather than decreasing as seen for the chisels from sample sets A, B and C. The improvement in speed with use is an advantage displayed by chisels according to the invention.

Figure 10:
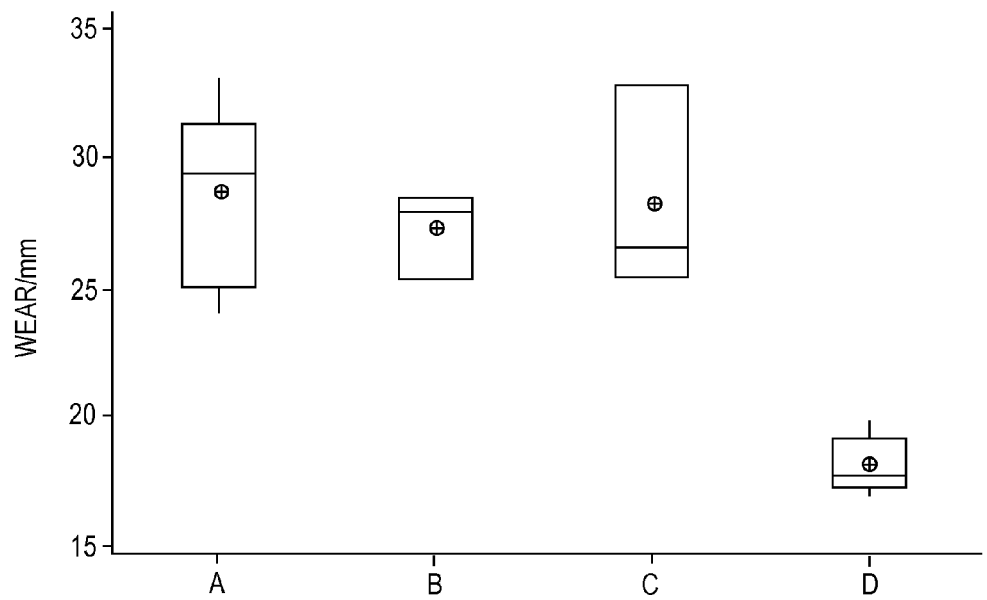
FIG. 10 is a box plot showing data from comparative tests of chisel tip wear.

FIG. 10 is a box plot showing data from comparative tests of chisel tip wear after 4 hours of use. The sample sets A, B, C and D correspond to the same sample sets of FIG. 9. It can be seen that the tip wear after 4 hours of use was lower in the chisels of sample set D, which are chisels according to the invention. Lower tip wear is advantageous, since it results in longer life of the chisel.

We claim:

1. A point chisel, comprising:
   a substantially circular cross-section shank having a longitudinal axis; and
   a tapered working end region in which the shank tapers to a working point, the tapered working end region comprising at least three converging substantially planar ribbed surfaces, each of which includes an elongate rib protruding therefrom and extending along at least part of the length thereof,
   wherein adjacent ribbed surfaces meet each other along at least part of their length at a substantially straight edge region situated between adjacent elongate ribs.

2. The chisel according to claim 1, wherein each substantially straight edge region projects radially outwardly with respect to the longitudinal axis.

3. The chisel according to claim 1, wherein the tapered working end region includes a working point region situated between the ribbed surfaces and the working point, the working point region comprising at least three converging substantially planar non-ribbed surfaces which meet at the working point.

4. The chisel according to claim 3, wherein each non-ribbed surface extends from a respective ribbed surface but is not coplanar therewith.

5. The chisel according to claim 1, wherein each rib has longitudinally extending substantially parallel and substantially planar side walls.

6. The chisel according to claim 1, wherein the adjacent ribbed surfaces comprise four converging substantially planar ribbed surfaces.

7. The chisel according to claim 1, wherein the shank is composed of a first steel having a microstructure comprising bainite, and the working end region is composed of a second steel having a microstructure comprising martensite, wherein the shank and the working end region are welded together.

\* \* \* \* \*